US006150289A

United States Patent [19]

Chen et al.

[11] Patent Number: 6,150,289

[45] Date of Patent: *Nov. 21, 2000

[54] COATING COMPOSITION FOR INK JET PAPER AND A PRODUCT THEREOF

[75] Inventors: Ching-Yih Chen, Milledgeville; Jimmy R. Godfrey, Tennille, both of Ga.

[73] Assignee: Imerys Pigments, Inc., Roswell, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/799,159

[22] Filed: Feb. 14, 1997

[51] Int. Cl.[7] .......................... C04B 33/00; C04B 14/04; C08K 3/34; B32B 3/00

[52] U.S. Cl. .......................... 501/148; 106/486; 524/447; 428/211

[58] Field of Search .................................... 106/486, 487; 524/447; 428/211, 452, 537.5; 501/144, 146, 148

[56] References Cited

U.S. PATENT DOCUMENTS

| | | | |
|---|---|---|---|
| 3,980,492 | 9/1976 | Thompson | 106/308 |
| 3,989,278 | 11/1976 | Torok et al. | 282/27.5 |
| 4,022,735 | 5/1977 | Thompson | 260/29.7 |
| 4,038,101 | 7/1977 | Thompson | 106/308 |
| 4,255,754 | 3/1981 | Crean | 346/75 |
| 4,304,815 | 12/1981 | Cugasi, Jr. | 428/280 |
| 4,374,203 | 2/1983 | Thompson et al. | 501/148 |
| 4,381,948 | 5/1983 | McConnell et al. | 106/288 |
| 4,474,847 | 10/1984 | Shroder et al. | 428/323 |
| 4,478,910 | 10/1984 | Oshima et al. | 428/331 |
| 4,554,181 | 11/1985 | Cousin et al. | 427/261 |
| 4,617,239 | 10/1986 | Maruyama et al. | 428/452 |
| 4,758,461 | 7/1988 | Aklya et al. | 428/212 |
| 4,767,466 | 8/1988 | Nemeh et al. | 106/487 |
| 4,780,356 | 10/1988 | Otouma | 428/212 |
| 4,859,246 | 8/1989 | Sennett | 106/487 |
| 4,892,787 | 1/1990 | Kruse et al. | 428/331 |
| 5,006,574 | 4/1991 | Sennett et al. | 523/351 |
| 5,112,782 | 5/1992 | Brown | 106/487 |
| 5,152,835 | 10/1992 | Nemeh | 106/447 |
| 5,169,441 | 12/1992 | Lauzon | 106/487 |
| 5,270,103 | 12/1993 | Oliver | 428/219 |
| 5,281,467 | 1/1994 | Shimada et al. | 428/195 |
| 5,322,879 | 6/1994 | Gane et al. | 106/487 |
| 5,384,013 | 1/1995 | Husband et al. | 162/168.1 |
| 5,429,999 | 7/1995 | Nae et al. | 502/148 |
| 5,454,864 | 10/1995 | Whalen-Shaw | 106/446 |
| 5,521,002 | 5/1996 | Sneed et al. | 428/331 |
| 5,616,286 | 4/1997 | Jordan | 501/148 |

*Primary Examiner*—Paul Marcantoni
*Attorney, Agent, or Firm*—Finnegan, Henderson, Farabow, Garrett & Dunner, L.L.P.

[57] ABSTRACT

Matte grade coated ink jet paper comprises a cellulosic substrate coated with a coating composition comprising a calcined kaolin clay particulate pigment comprising porous aggregates with a total pore volume of 0.60 $cm^3/g$ to 2.00 $cm^3/g$, a narrow particle size distribution where about 90 weight % has an E.S.D. less than 2 microns a mean pore size less than 0.8 microns in diameter, and a cationic polymer with an average molecular weight in the range of 1,000 to 5 million daltons which polymer acts as a dispersant in a precursor slurry and produces a net positive charge on the calcined clay pigment. This chemically treated clay pigment is used in a final coating formulation for the substrate to provide high printing ink density, printed and coating gloss, water fastness resistance, low wicking, and low bleeding on most ink jet papers. The calcined kaolin clay provides a high coating solids of about 30 to about 70 weight % solids, based on the weight of the slurry, and good viscosities and rheology, therefore, making the pigment suitable for most commercial high speed coaters.

15 Claims, No Drawings

COATING COMPOSITION FOR INK JET PAPER AND A PRODUCT THEREOF

BACKGROUND OF THE INVENTION

1. Field of the Invention

This invention relates generally to ink jet paper used in ink jet printing and, more particularly, to a coating composition suitable for making matte grade coated ink jet paper. The improvement relates to the use of a paper coating composition primarily of an engineered kaolin clay which is treated with a cationic polymer.

2. Description of Related Art

In ink jet printing, uniformly shaped droplets of aqueous or solvent-based dye solutions are ejected from a nozzle onto a paper or other substrate. The paper and surface chemistry requirements for good print quality vary widely and may rely on coating materials to create appropriate ink sorption characteristics.

Ink jet inks may be water-based or may have an alkylene glycol or other solvent base.

For the printing of well shaped dots by means of ink jets, and especially for multi-color printing with ink jets, the use of paper coated with a pigment is highly desirable. The pigment and the binder of the coating may generally serve to sorb the solvent of the ink (i.e. dry the ink) and hold the dye stuff of the ink on the surface of the coating to maximize the visual effect of the ink.

A binder used in a paper coating generally serves the function of holding the pigment so as to reduce or eliminate dusting or chalking thereof, since ink jet printers with very fine orifice nozzles are quite susceptible to clogging. Also, the binder should help in the sorption of the solvent of the ink. If too high a binder is used, ink will remain on the surface and will smear or even splatter when hitting the surface after ejection from the nozzle. Too weak a binder will not hold the pigment without chalking.

U.S. Pat. No. 4,892,787 issuing on Jan. 9, 1990 discloses a cellulosic substrate coated with a mixture of a particular pigment having a surface range of about 100 to 350 $m^2/g$ and an average particle size of less than about 8 $\mu$m, and a binder comprising a mixture of an acrylic resin and polyvinyl alcohol in effective amounts to minimize chalking of the pigment and to sorb solvent from the water-or glycol-based jet printing ink. The pigment is selected from the group consisting of silica, alumina, silica-aluminum and titania.

The teachings of this U.S. Pat. No. 4,892,787 provide a coating with fractal dimension of less than 1.1 and aspect ratios of less than 1.1, as exhibited by dots formed by ink jet printers on the coating disclosed therein. The coating does not chalk, but other printing performance factors of the ink jet paper, such as color ink densities, ink drying rate, water fastness resistance, wicking and bleeding are not addressed in this U.S. Pat. No. 4,892,787.

U.S. Pat. No. 5,281,467 issuing on Jan. 25, 1994 discloses an ink jet recording paper with a coating containing a pigment which achieves excellent ink absorption, smoothness, gloss, and water resistance together with an excellent dot density, sharpness, and roundness to ensure recording of high quality, high contrast full color images. The coating is applied to a support by a cast coating method, and the pigment comprises at least 50 weight percent of a calcium carbonate-compounded silica. The average particle size of the compound silica is no greater than 3 $\mu$m in order to increase dot sharpness and density. The specific surface area of the compound silica as measured by the BET method is preferably no greater than 80 $m^2/g$. A binder is added to the coating composition in order to improve adhesion of the pigment to the support and render the coating uniform. It is also desirable that the coating contain a cationic polymer to improve the water resistance of the recorded image. Some disadvantages of the coating of this U.S. Pat. No. 5,281,467 is that the coating composition in slurry form contains low coating solids, poor rheology, and is expensive to manufacture.

U.S. Pat. No. 4,554,181 issuing on Nov. 19, 1985 to the Mead Corporation discloses an ink jet recording sheet having a recording surface which includes a combination of a water soluble polyvalent metal salt and a cationic polymer having cationic groups which are available in the recording surface for insolubilizing an anionic dye. The recording surface may be formed by applying an aqueous solution of the aforesaid salt and polymer to the surface of an absorbent sheet material such as paper or by applying a coating containing the polymer and salt combination alone or in combination with a binder which may be water swellable, and other additives, to the surface of a substrate, such as paper or plastic film. The combination of the salt and cationic polymer achieve images of improved density, water fastness, and sharpness. Coated paper products can be prepared by incorporating a water soluble polyvalent metal salt and a cationic polymer or latex into a conventional paper coating composition and applying the coating to the paper substrate using conventional coating techniques. Such conventional coatings typically include a white pigment such as clay, diatomaceous earth, baryta, and/or calcium carbonate, and a binder such as gelatin, etherified starch, or polyvinyl alcohol.

U.S. Pat. No. 4,425,405 to Mjrakami et al. describes a coating composition containing a white filler and polyvinyl pyrrolidone. Preferably, the salt and the cationic polymer are added to this coating composition in an amount of about 0.1 to 30 parts per 100 parts composition.

U.S. Pat. No. 5,270,103 to Oliver et al. discloses the use of coated ink jet sheets comprising a silicate or silicate pigment with a two component binder of polyvinyl alcohol and cationic polymers, including polyamines, to improve color density.

The prior art, including that described hereinabove, disclose specific means and/or methods for achieving certain objectives, such as high image quality, such as high color sharpness and high resolution or high printing performance, such as reduced offset, feathering, paper curl, and improved water fastness, and the prior art has several drawbacks and disadvantages. In some of the teachings of the prior art, the density, sharpness, and roundness of each dot still may not be good enough to obtain high quality, high contrast, full color recorded images for ink jet paper.

Some coating compositions, such as silica-based coatings, applied to a substrate, tend to produce an ink jet paper with a relatively high print performance. However, the costs for these commercially available papers with silica coatings tend to be high due to the raw materials and the manufacturing process.

It would be ideal to have commercially available, an ink jet paper with at least the same or better quality print performance as those with the silica-based coating compositions, but produced at a lower manufacturing cost and at higher coat weights to increase opacity for two-sided printing.

SUMMARY OF THE INVENTION

It has been found that surprising results were obtained by preparing an ink jet coating slurry comprising calcined kaolin clay pigment which is porous and has a narrow particle size distribution and an effective amount of cationic polymer. The treated pigment, in dry form or in slurry form, may be prepared for shipping purposes as a precursor coating for ultimate use in a final coating formulation applied to paper to produce a matte grade coating ink jet paper. The specially designed pigment, the cationic polymer/pigment/binders ratio, and the molecular weight of the cationic polymer contribute to improve dot density and dot roundness, and water fastness resistance and reduced feathering and offset for a matte grade coated ink jet paper. The particle size distribution of the calcined kaolin clay pigment is such that about 90 weight % is less than 2 microns in equivalent spherical diameter.

The cationic polymer of the invention possesses a net positive charge and is preferably a polymeric amine such as a polymer of quaternary amines or amines which are converted to quaternary amines under acid conditions. The cationic polymer may also contain two or more cationic monomers or contain a cationic monomer and other nonionic or anionic monomers. These cationic polymers possess a molecular weight from about 1,000 daltons to about 5,000,000 daltons, as determined by gel permeation chromatography. Physical blends of cationic polymers containing different cationic moieties or blends of cationic polymers possessing different molecular weight averages and distributions are also contemplated within the scope of this invention.

It is therefore an object of the invention to provide an ink jet recording surface with a final coating composition having good ink drying, and ink absorption, and/or water resistance with low wicking and bleeding together with an acceptable dot density, sharpness and roundness, and which is suitable for the recording of high quality, high contrast full color images.

It is a further object of the present invention to provide an ink jet recording surface with a final coating composition which results in print performance which is at least equal to or better than silica coatings but less expensive than the raw materials and manufacturing costs of silica coatings, and in higher coating solids which may result in higher coat weights and better coating rheology in comparison to the silica coatings, and which coating composition can be used in a whole variety of conventional coaters.

The aforesaid objects of the invention are attained by an ink jet recording paper having a support provided on at least one surface with a final coating composition where a precursor coating composition comprises kaolin clay pigment chemically treated with a cationic polymer and which precursor coating composition is characterized in that the aqueous slurry contains about 30 to 70 weight % solids, based on the weight of the slurry, and the ratio of the pigment to the polymer in this slurry ranges from about 10 to about 1.

In accordance with an embodiment of the present invention, an improved ink jet paper has a precursor coating composition comprising a porous calcined kaolin clay pigment and a medium to high molecular weight cationic polymer. The molecular weight of the cationic polymer is about 1,000 to 5 million daltons. The total pore volume of the pigment is about 1.00 $cm^3/g$ to about 1.50 $cm^3/g$ by mercury porosimetry. The mean pore size is between 0.1 to 0.8 microns and perhaps between 0.1 to 0.5 microns in diameter. The particle size distribution is such that about 100% by weight are less than 10 microns E.S.D.; about 98% by weight are less than 5 microns E.S.D.; about 90% by weight are less than 2 microns E.S.D.; about 80% by weight are less than 1 micron; about 30% by weight are less than 0.5 micron E.S.D.; and about 2% by weight are less than 0.25 micron E.S.D. The cationic polymer acts primarily as a dispersant in the slurry form resulting in a high percent solids by weight of about 30 to 70 weight % solids. This precursor coating composition is then employed in a final coating composition where the coating formulation comprises 100 parts of the precursor coating composition, and to this is added about 20 to 30 parts polyvinyl alcohol used as a binder; 30 to 50 parts latex used as a binder; 1 to 5 parts cross-linking agent used to cross-link the binders; and 0 to 3.0 parts optical brightening agent added to form a final coating composition of about 30 to 70 weight % solids, based on the weight of the slurry. The ratio of chemically treated pigment with cationic polymer to polyvinyl alcohol binder to latex binder on a dry basis ranges from about 1:0.15:0.05 to about 1:1:1.6 which is used in a final coating composition.

DETAILED DESCRIPTION OF THE INVENTION

The present invention is directed to a coating composition which comprises: a) an aqueous slurry containing about 30 to about 70 weight % solids, based on the weight of said aqueous slurry, of a calcined kaolin clay, preferably about 30–40%, more preferably about 32 to about 35%; and b) an effective amount of a cationic polymer or cationic polymer admixture, wherein said cationic polymer or cationic polymer admixture reacts with said calcined kaolin clay and wherein said effective amount is an amount of cationic polymer sufficient to produce a net positive charge on said calcined kaolin clay. Generally, about 5 to about 50 parts (on an active weight basis) of cationic polymer should be used per 100 parts of calcined kaolin clay. Preferably, the ratio is about 10 to about 40 parts per 100 parts clay, more preferably about 20 to about 30 parts per 100 parts clay. Preferred cationic polymers are selected from the groups consisting of polyamines, polydialkyldiallylammonium halides and polymers prepared by polymerizing a dialkyidiallylammonium halide with another ethylenically unsaturated cationic, anionic or nonionic monomer. The preferred dialkyldiallylammonium halide monomers are dimethyl or diethyl diallylammonium chloride, with dimethyldiallylammonium chloride polymers being most preferred in this class.

Admixtures containing a cationic polymer and one or more additional polymers can also be used. The key is to provide sufficient cationic polymer (either as a single cationic polymer or multiple cationic polymers) to provide a net positive charge on the calcined kaolin clay being treated.

The molecular weight of the instant cationic polymers ranges between about 1000 and about 5 million daltons, preferably between about 250,000 and about 1 million daltons. The preferred calcined kaolin clay in aggregate form has a mean pore size less than about 0.80 microns in diameter, and a particle size distribution wherein about 90% are less than 2 microns E.S.D. Further, the preferred calcined kaolin clay has a total pore volume of about 0.60 $cm^3/g$ to about 2.00 $cm^3g$. More preferably, the calcined kaolin clay, in aggregate form, has a particle size distribution wherein about 100 weight % are less than 10 microns E.S.D.; about 98 weight % are less than about 5 microns E.S.D.; about 90 weight % are less than about 2 microns E.S.D.; about 80% are less than about 1 micron E.S.D.; about 30 weight % are less than about 0.5 micron E.S.D.; and about 2 weight % are less than 0.25 micron E.S.D.

The instant coating compositions may additionally comprise about 20 to about 30 parts by weight (on an active basis) per 100 parts by weight calcined kaolin clay, of a polyvinyl alcohol binder; about 30 to about 50 parts by weight (on an active basis) per 100 parts by weight calcined kaolin clay, of a latex binder; and about 0 to about 5.0 parts by weight (on an active basis) per 100 parts by weight calcined kaolin clay, of a cross-linking agent, wherein the crosslinking agent, if used, acts to crosslink said binders. Preferably, the ratio of calcined kaolin clay to polyvinyl alcohol binder to latex binder on a dry, active weight basis ranges from about 1.0:0.15:0.05 to about 1:1:1.6.

The coating compositions are applied to coating substrates, preferably paper substrates. More preferably, the substrate is a substrate useful in ink jet printing.

The instant invention is also directed to compositions comprising: a) a coating substrate; and b) an effective amount of the above described coating compositions, wherein effective amount refers to the quantity of coating composition necessary to effectively coat the substrate being treated. Preferably, the substrate is a paper substrate and more preferably the substrate is a substrate useful in ink jet printing.

The instant invention is further directed to a method of preparing a coating composition for coating a substrate, comprising: a) preparing a calcined kaolin clay aqueous slurry containing about 30 to about 70 weight % solids, based on the total weight of said aqueous slurry; and b) adding an effective amount of at least one cationic polymer to the aqueous slurry, thereby dispersing the calcined kaolin clay and producing a net positive charge on the calcined kaolin clay. This method may further comprise the steps of adding about 20 to about 30 parts by weight (on an active basis) per 100 parts by weight of calcined kaolin clay, of a polyvinyl alcohol binder; about 30 to about 50 parts by weight (on an active basis) per 100 parts by weight of calcined kaolin clay, of a latex binder; and about 0 to about 5.0 parts by weight (on an active basis) per 100 parts by weight of calcined kaolin clay, of a cross-linking agent.

Preferably the ratio of clay to polyvinyl alcohol binder to latex binder on a dry active basis ranges from about 1.0:0.15:0.05 to about 1.0:1.0:1.6. This method may additionally comprise drying the resulting product to produce a substantially moisture-free calcined clay pigment coated with the cationic polymer employed. The dryed product may then be filtered, preferably through at least a 50 mesh sieve and then optionally through a 100 mesh sieve, to remove undispersed particles and agglomerates.

Thus, the coating composition of the instant invention for ultimate use as a coating on at least one side of a web comprises an aqueous slurry of the components described herein.

A suitable calcined kaolin clay pigment for use in the invention substantially corresponds to the commercially available product ALPHATEX® of the present assignee, ECC International Inc. (Atlanta, Ga.). The manner in producing this ALPHATEX® product is taught in McConnell et al., U.S. Pat. No. 4,381,948, which is incorporated herein by reference. This ALPHATEX® product is prepared by first blunging and dispersing an appropriate crude kaolin to form an aqueous dispersion of same. The blunged and dispersed aqueous slurry is subjected to a particle size separation from which there is recovered a slurry of the clay, which includes a very fine particle size, e.g., substantially all particles are smaller than 1 micrometer E.S.D. The slurry is dried to produce a relatively moisture-free clay, which is then thoroughly pulverized to break up agglomerates. This material is then used as a feed to a calciner. Such feed is calcined under carefully controlled conditions to typical temperatures of at least 900° C. The resulting product is cooled and pulverized to provide a pigment of porous aggregates of kaolin platelets. For the invention, this final pulverization step for the calcined product produces the desired clay particle size distribution as set forth below, (E.S.D. refers to equivalent spherical diameter):

100 weight % has an E.S.D. of <10 microns
about 98 weight % has an E.S.D. of <5 microns
about 90 weight % has an E.S.D. of <2 microns
about 80 weight % has an E.S.D. of <1 micron
about 30 weight % has an E.S.D. of <0.5 micron
about 2 weight % has an E.S.D. of <0.25 micron This final pulverization step involves a dry grinding process in a conventional ball mill. This ALPHATEX® product has generally been used as a filler in paper sheets and similar paper products in view of its porous aggregates and its high light-scattering ability. The present invention finds this product to be exceptionally suitable as a coating pigment for making matte grade coated ink jet paper. Its porous aggregates of kaolin clay platelets act to create a coating porosity for good ink absorption.

The porous aggregates which compose the particles, are believed to be instrumental in producing outlets for the aqueous ink to penetrate vertically through the coating layer without ink spreading or wicking, by virtue of their high porosity, which porosity, in turn, is defined by the total pore volume and the mean pore size. The mean internal pore size of the aggregate is generally less than 0.80 microns in diameter. The total pore volume of the porous aggregates is about 0.60 $cm^3/g$ to about 2.00 $cm^3/g$. Large pore diameters provide a porosity which is thought to allow the ink vehicle to penetrate to the coating for complete ink drying.

Certain cationic polymers may be used as retention aids in the paper industry. Cationic polymers can be used in the recording surface for dye insolubilization when they are added to the paper after sheet formation. When used as retention aids, these polymers are added at the wet end of the paper making process where they pick up counter ions which will not exchange for the anionic dye. In conventional papers in which these polymers are used as retention aids, the polymers do not contain cationic groups which are available for dye insolubilization.

In the present invention, an excess of cationic polymer is used to neutralize, through salt formation, a sufficient number of negatively charged sites on the surface and edges of the calcined clay particles to create particles possessing a net positive charge to react with an anionic dye or ink. As used herein, the term "effective amount of cationic polymer" is that amount of cationic polymer which at least creates clay particles possessing this net positive charge.

In accordance with a preferred embodiment of the invention, the cationic polymer is water soluble and is used generally as a dispersant in the aqueous slurry containing the calcined kaolin clay pigment.

A representative example of a commercially available polymer that is useful in the invention is Hydraid 2060, a polyamine product available from Calgon Corporation, Pittsburgh, Pa. This polymer is about 50% active and has a molecular weight greater than 100,000 daltons.

The suitable polymer for use in this invention, i.e., Hydraid 2060, is a branched polymer derived from the condensation reaction of dimethylamine, epichlorohydrin, and small amounts of a primary amine, such as methyl amine, or ammonia. As a quaternary ammonium polymer, 100 mol % of the monomer units are cationic.

The surface of a calcined clay usually carries a net negative charge. It is theorized by the inventors that mixing of the cationic polymer with the anionic clay results in the reaction of the polymer at the negatively charged sites on the surface of the clay to form a salt bond between the clay surface and the polymer. A single polymer strand may react with multiple sites on the surface of a single clay particle or bridge sites between particles, causing particle aggregation or coagulation. In the presence of sufficient cationic polymer, many of the negative sites on the surface of the calcined clay are neutralized and the clay surface acquires a net positive charge. The presence of this net positive charge provides the energy needed to repulse or disperse other clay particles, thus the cationic polymer of the invention acting as a dispersant in the aqueous slurry containing the calcined kaolin clay particles.

Since cationic polymers are generally hygroscopic, i.e., water-absorbing, there is a critical range of cationic polymer to clay ratio needed to bond with and to cationize the surface. Below this dosage range the surface still has a net negative charge. Above this dosage range, the surface is cationic, but coated with excess polymer and too hygroscopic. The amount of polymer needed to cationize the clay surface and the chemical nature of the coating will vary with polymer molecular weight, composition, and three dimensional structure.

Most ink jet inks are anionic or amphoteric (having negative and positive charge groups in the same molecule). When the ink is deposited onto the surface of the polymer treated clay, salt bonds are formed between the cationic polymer and the anionic groups, usually sulfonic acids, on the ink/dye molecule. This reaction fixes the ink to the surface. Additional weak bonds, e.g., hydrogen bonding and Van der Waals bonds, are formed between the polymer, clay and dye molecules to provide multiple points of attachment for the ink/dye. It is believed that as the number of bonds between the ink and polymer/clay surface increase, the energy needed for a solvent like water to break all of these bonds at once to free the ink increases significantly. Consequently, the printed surface becomes water fast.

Preferably, the cationic polymer of the invention is a polymeric amine, such as a polymer of quaternary amine or amines which are converted to quaternary amines under acid conditions.

Cationic polymers which may be used in the invention may be polyamines, or polymers and copolymers of dialkyldiallylammonium halides or admixtures thereof.

Cationic polymers which may be used in the invention are generally characterized as having an active basis from about 8% to about 50% and a molecular weight from about 1,000 daltons to about 5 million daltons. Representative polymers are linear or branched polyamines represented by structure (I)

(I)

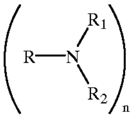 ;

wherein $R_1$ and $R_2$, which may be the same or different, are selected from the group consisting of straight or branched $C_1$–$C_8$ alkyl, substituted straight or branched $C_1$–$C_8$ alkyl and hydrogen; wherein R is selected from the group consisting of straight or branched $C_1$–$C_8$ alkyl and substituted straight or branched $C_1$–$C_8$ alkyl, and wherein n ranges from 2–50,000.

Other cationic polymers are linear or branched polymers of cationic monomers, such as alkyl- or dialkyldiallylammonium halides, especially dimethyidiallylammonium chloride, dimethylaminoethylmethacrylate and its methyl chloride or dimethyl sulfate quaternary ammonium salts, dimethylaminoethylacrylate and its methyl chloride salt, methacrylamidopropyltrimethylammonium chloride and its unquaternized amine form, acrylamidopropyltrimethylammonium chloride and its unquaternized amine form. Other cationic polymers include condensates of formaldehyde with melamine, urea, or cyanoguanidine.

The cationic polymers useful in this invention also include copolymers of the aforementioned cationic monomers with nonionic monomers, such as acrylamide, methacrylamide, vinyl acetate, vinyl alcohol, N-methylolacrylamide, or diacetone acrylamide, and/or anionic monomers, such as acrylic acid, methacrylic acid, AMPS, or maleic acid, such that the net charge of these polymers is cationic.

Examples of other commercially available cationic polymers useful in the invention are Hydraid 2010; Hydraid 2020; Hydraid 2030; Hydraid 2040; Hydraid 2070; Hydraid 2080, which are polydimethyidiallylammonium chlorides (p-DMDAAC); and Hydraid 2050, a polyamine, all of which have a molecular weight of from about 2,000 to 5 million daltons, and all of which are products available from Calgon Corporation, Pittsburgh, Pa.

One embodiment of the present invention is to provide a coating composition for a base stock to produce a matte grade ink jet paper for use in ink jet printing. Preferably, the substrate is comprised of any of a variety of papers, including wood-based and rag-based papers, such as vellum. However, those skilled in the art will appreciate that the invention may be applied to any of a wide variety of substrates, such as synthetic paper or plastic film, as circumstances dictate.

The coating composition of the invention is formed by mixing an engineered calcined kaolin clay pigment having certain physical characteristics, such as the particle size distribution, the total pore volume, and the mean pore size, disclosed hereinabove, with a cationic polymer which is used to chemically treat this specially designed pigment.

Throughout the description of the invention, where "parts" for the chemicals used in the invention are given, it is to be interpreted as parts by weight per 100 parts by weight of the pigment.

The coating composition comprises an engineered kaolin clay pigment chemically treated with a cationic polymer with a medium to a high molecular weight, from about 1,000 daltons to about 5 million daltons, preferably about 100,000 to 2 million daltons and, most preferably, about 250,000 to about 1 million daltons. This composition is formed by making an aqueous slurry where about 5 to about 50 parts by weight, more preferably about 10 to about 40 parts by weight and, most preferably, about 19 to about 27 parts by weight of cationic polymer per 100 parts of pigment by weight, on a dry basis, is first mixed with a proper amount of warm solvent (water) at a temperature of 30 to 40° Celsius. The calcined kaolin clay is gradually added to and mixed with the chemical/solvent for complete pigment dispersion until a 30 to 40 weight % solids, and preferably about 30 to 70 weight % solids, coating slurry is formed. The dispersed slurry is then filtered first through a 50 mesh screen, and then through a 100 mesh screen for removing the undispersed particles and agglomerates. The filtered product is then ready to be shipped to the end user, which may be a paper manufacturer. This coating composition preferably, in slurry form, is a precursor for the final coating applied onto the substrate. If a dry form of the product of the invention is desired, then the slurried product can be dried by conventional means such as a spray dryer to produce a moisture-free calcined clay pigment coated with the cationic polymer.

As a final coating composition which is applied to the substrate, this precursor coating composition is preferably mixed with additional chemicals. The following provides a preferred final coating formulation which may be used by a paper manufacturer.

A Preferred Final Coating Formulation

To a 100 parts of the precursor coating composition, in slurry form, comprising the calcined clay pigment and the cationic polymer, add the following:

23.4 Parts: Polyvinyl Alcohol (PVOH) (a binder)

36.2 Parts: Latex (a binder)

1.7 Parts: Cross-linking Agent 3.0 Parts: Optical Brightening Agent

Suitable polyvinyl alcohols are characterized as being hydrophilic, cross-linkable with the cross-linking agent, and film-forming. A suitable polyvinyl alcohol is available from the Air Products Co. under the tradename AIRVOL® 103, which is 98.0 to 98.8% hydrolyzed, has a pH of 5.0 to 7.0., and a molecular weight of 13,000 to 23,000 daltons. Other polyvinyl alcohols which may be suitable in the invention are available from DuPont under the trade designations Elvanol 71-30 and HV. Elvanol 71-30 polyvinyl alcohol is 98% hydrolyzed, has a pH of 6, and has a medium molecular weight as measured by viscosity. DuPont Elvanol HV polyvinyl alcohol is 99–100% hydrolyzed, has a pH of 6 and a high molecular weight as measured by viscosity.

A suitable latex is characterized as being "pigment interactive". Such a suitable latex is available from Dow Chemical U.S.A., Midland, Mich. under the tradename Latex CP 654NA. This latex is a carboxylated styrene-butadiene latex which is designed for use with starch as a cobinder in pigmented paper coatings and where its pigment interaction characteristics contribute to quicker coating set, resulting in improved fiber coverage and coating smoothness.

A suitable cross-linking agent is characterized as cross-linking the polyvinyl alcohol binder with the latex binder to improve the water fastness or water resistance of the recorded image. Such a suitable cross-linking agent is water soluble, and has sufficient active sites on their molecules to react with the binders to efficiently cross-link these components. A suitable cross-linking agent is available from Hopton Technologies, Inc., Albany, Ore., under the tradename HTI Insolubilizer 5800M Ammonium Zirconium Carbonate (AZC), which is a metallic ion.

Where coating formulation is given herein involving the inventive pigment, the chemicals used were as follows: the polyvinyl alcohol was Airvol® 103, the latex binder was Latex CP 654NA, the cross-linking agent was HTI 5800M Ammonium Zirconium Carbonate (AZC), and the optical brightening agent, if used, were those conventionally available and known to those skilled in the art.

Lab Procedure For Forming Precursor Coating Slurry

The engineered calcined clay treated with a cationic polymer according to the teachings of the invention was made available for shipping to a paper manufacturer in a 32% weight % solids for making matte finish coated ink jet paper. This aqueous slurry was comprised of the engineered calcined clay and the cationic polymer, as disclosed hereinabove. The calcined clay was made through the normal process for making the ALPHATEX® product as disclosed in the aforesaid McConnell et al. U.S. Pat. No. 4,381,948, and then pulverized in a ball mill to the desired particle size distribution.

Lab results showed that the clay particle size distribution in equivalent spherical diameter (e.s.d.) of the calcined clay pigment used in the following examples of the invention were:

100 weight % <10 microns 98 weight % <5 microns 90 weight % <2 microns 80 weight % <1 micron 30 weight % <0.5 microns 2 weight % <0.25 microns The aqueous slurry was prepared by measuring out about 20–22 parts by weight per 100 parts by weight of the calcined clay pigment, of the cationic polymer and then transferring this polymer to a simple mixing tank that is equipped with high speed/ low shear mixing blades. A proper amount, of about 70% of total batch weight for the slurry, of warm tap water at about 30 to 40° Celsius was pumped into the mixing tank. Initially, the chemical/water solution was mixed at a blade speed of 1000 rpm (revolutions per minute) for 5 minutes, being careful to avoid the polymer from sticking to the mixing spindle. Since the polymer has a high viscosity of about 2,000 to about 4,000 centipoise (cps), it has a tendency to climb up the mixing spindle. The blade speed was then increased to 2000 rpm and the solution was mixed for another 5 minutes. The dry calcined pigment was added to this solution at a slow feed rate at about 1 to 2 lbs./minute until the pigment was completely dispersed in the chemical/water solution. If necessary, the mixer speed can be increased for this pigment dispersion. For a thorough clay/chemical dispersion in the slurry, the clay/chemical slurry should be mixed at a blade speed between 1000–2000 rpm for 15 minutes. The dispersed slurry was then filtered first through a 50 mesh sieve, and then through a 100 mesh sieve where the undispersed particles and agglomerates were removed. The filtered product, in slurry form, comprising 32% weight % solids, was then ready for shipment to a potential end user.

Final Coating Composition

Preferably, the chemically treated clay pigment is shipped in slurry form and used in a final coating composition where the coating formulation comprises the precursor coating composition. To this, about 20 to 30 parts by weight of polyvinyl alcohol; 30 to 50 parts by weight of latex; 1 to 5 parts by weight of cross-linking agent; and 0 to 3.0 parts by weight of optical brightening agents per 100 parts by weight of pigment are added to form a final coating composition of about 30% to about 70% solids.

Lab Scale Samples

The coating composition of the invention comprising the specially engineered kaolin clay pigment is preferred by the inventors in view of the low manufacturing costs due to low energy consumption and capital investment. Lab scale samples were made and tested for its slurry stability in a 30 day period. The Helios low shear viscosity results indicated that the slurry was highly stable with no viscosity change during this 30 day test. The kaolin clay slurry of the invention was able to be made down easily into a coating color that was more stable than the silica coatings of the prior art. Unlike coater limitations of most silica coatings, the inventive coating composition can be applied by various types of coaters, including the metering size press, rod, gate roll, and blade coaters.

Application Testing

Application testing was performed in four different ways: 1) lab hand draw down; 2) hand draw down vs. commercial coated ink jet paper; 3) first coating trial; and 4) second pilot coating trial. Where a coating formulation involving the inventive pigment, the chemicals used were as follows: the polyvinyl alcohol was Airvol® 103; the latex binder was Latex CP 654NA; and the cross-linking agent was HTI 5800M Ammonium Zirconium Carbonate (AZC).

1) Ink Jet Coating Lab Hand Draw Down Study

The objective of this study was to compare the coating composition of the invention comprising the chemically treated calcined clay to that of the prior art containing silica as a pigment with regard to coated sheet properties and printing properties. The same coating formulation was used in both coating compositions, with only the type of pigment differing with that of the invention being the specially designed calcined clay chemically treated with a cationic polymer in accordance with the teachings of the present invention. The coating formulation and results are shown in Table I.

TABLE I

| Coating Formulation: | | |
|---|---|---|
| Pigment | 100 parts | |
| PVOH | 20 parts | |
| Latex | 50 parts | |
| Cross-Linking Agent | 5 parts | |
| **Coating Results:** | **Invention (Calcined Clay)** | **Prior Art (Silica)** |
| % Coating Solids | 38.36 | 25.19 |
| pH | 7.4 | 5.6 |
| Brookfield Viscosity | | |
| Spindle # | 6 | 5 |
| @10 rpm | 21,800 cps | 4,400 cps |
| @20 rpm | 13,250 cps | 5,000 cps |
| @50 rpm | 6,720 cps | 2,640 cps |
| @100 rpm | 4,300 cps | 1,672 cps |
| Hercules Viscosity @ 4400 (kilodynes-cm) | 5,500 cps | 2,000 cps |
| Coated Sheet Properties @ 8 g/m$^2$ Coat Weight | | |
| Brightness (ISO) | 88.94 | 90.62 |
| OBA* | 0 | 0 |
| Hunter | | |
| L | 93.37 | 94.19 |
| a | 0.75 | 0.64 |
| b | −0.93 | −1.28 |
| Opacity | 95.06 | 95.23 |
| Sheet Gloss | 5.22 | 2.84 |
| Printing Properties | | |
| Ink Density | | |
| Cyan | 1.46 | 1.60 |
| Magenta | 1.48 | 1.50 |
| Yellow | 1.12 | 1.08 |
| Black | 1.63 | 1.62 |
| Bleeding | Minimum | Minimum |
| Wicking | Minimum | Minimum |
| Print Gloss | | |
| Cyan | 5.9 | 2.1 |

TABLE I-continued

| | | |
|---|---|---|
| Magenta | 4.7 | 2.2 |
| Yellow | 4.5 | 2.7 |
| Black | 20.2 | 4.6 |
| Ink Drying | | |
| Primary Colors (CMY**) | Fast | Fast |
| Secondary (RGB***) | Fast | Fast |
| Black | Slow | Slow |
| Water Fastness Resistance | Yes | Yes |

*"CMY" Means Cyan, Magenta, and Yellow.
**"RGB" Means Red, Green, and Blue.
***"OBA" Means Optical Brightening Agent.

The conclusions made from this study were:

1 ) The percent solids for the coating composition of the invention was 13 percent higher than that of the prior art containing silica.

2) Both compositions exhibited similar performance with respect to color ink densities, ink drying rate, water fastness resistance, wicking, and bleeding.

3) The brightness value for the coating composition of the invention was 1.7 points lower than that of the prior art coating composition, indicating the potential need for using an optical brightening agent in the slurry to increase brightness of the composition of the invention. This brightening agent was included in the recommended coating formulation disclosed hereinabove for the present invention. The optical brightening agents are well-known in the art and several are readily available and commonly used.

4) Both sheet gloss and print gloss for the invention were significantly improved over that of the prior art.

2) Hand Draw Down vs. Commercial Coated Ink Jet Paper

The objective of this study was to compare the printing performance of a paper coated with the coating composition of the invention to that of a commercially available paper coated with a silica coating of the prior art. The base stock of the paper coated with the composition of the invention was a non-sized free paper of basis weight 90 g/m$^2$ Hammermill laser print, and that of the commercially available paper was made by Otis Specialty, Inc., Maine. It is not certain as to the coating formulation of the commercially available paper. The coating formulation of the coating composition of the invention was in accordance with that disclosed hereinabove with regard to Table I for the first lab hand draw down study. The results of this test are shown in Table II.

TABLE II

| Printing Performance: | Commercial Paper (Silica) | Invention (Calcined Kaolin Clay) |
|---|---|---|
| Ink Density | | |
| Cyan | 1.47 | 1.46 |
| Magenta | 1.45 | 1.36 |
| Yellow | 1.12 | 1.05 |
| Black | 1.27 | 1.63 |
| Dot Size (Magenta) | | |
| Average (micron$^2$) | 10,840 | 8,875 |
| Dot Shape Factor | 0.2915 | 0.5647 |
| Print Mottle | | |

TABLE II-continued

| Printing Performance: | Commercial Paper (Silica) | Invention (Calcined Kaolin Clay) |
|---|---|---|
| Primary Colors (CMY*) | No | No |
| Secondary (RGB**) | Visible | No |
| Black | Visible | No |
| wicking | Some | Minimum |
| Bleeding | Some | Minimum |
| Water Fast Resistance | Good | Good |
| % Coating Solids | <25% | 30–40% |

*"CMY" Means Cyan, Magenta, and Yellow.
**"RGB" Means Red, Green and Blue.

The conclusions were as follows: Both paper samples were close in color ink density values and water fast resistance. However, the black ink density of the sample with the inventive coating composition was 0.35 points higher than that of the commercial paper sample. The paper sample with the inventive coating composition exhibited smaller dot areas and a higher dot shape factor, indicating a better dot roundness and a lower dot gain. The percent coating solids of the commercial sample paper was also lower at less than 25% than that of the inventive sample (30–40%), which factor most likely contributed to the print mottle problem of the commercial paper whereby the coating penetrated to the base stock.

3) First Coating Trial

A coating color was prepared using the preferred coating formulation of the invention: (parts by weight)

To 100 parts: chemically treated calcined clay pigment of the invention

Add: 23.4 parts: polyvinyl alcohol binder 36.2 parts: latex binder 1.7 parts: cross-linking agent 3.0 parts: optical brightening agent The objective of this trial was to understand the runnability of the coating on different base stocks. The coating was applied to two base stocks, one sized and one unsized, in a paper machine with an in-line coater machine. The coater machine was set up to apply the felt side of the stock with a gate roll coater and the wire side of the stock with a flood nip size press.

The rheology of the coating at 32.0% solids is shown in Table III. It is to be appreciated that in a Hercules rheometer there are several "bobs" designated as "A", "E", "FF", etc. The "E" and "FF" bobs are used more frequently for the coating colors for measuring their high shear viscosity. An "A" bob generally is used for measuring the pigment slurry.

TABLE III

| Brookfield Viscosity | Hercules Viscosity |
|---|---|
| Spindle No. 4 @ 20 rpm - 720 cps | Bob FF @ 4400 rpm - 57.3 cps |

The conclusion of this trial was that the runnability of the coating in this trial was very satisfactory. The coating color circulated extremely well with no coating lumps and/or foaming problems. At the end of the first trial day, the coating rheology and coating solids were rechecked. The coating solids and the Hercules high shear viscosity were unchanged remaining at 32% solids and 57.3 cps, respectively. However, the Brookfield low shear viscosity dropped from 720 cps to 180 cps. This was probably due to the relaxing of the cationic polymer and may represent a "plus" in that the lower shear viscosity may help the coating color to flow more freely in the coating line.

4) Second Pilot Coating Trial

The objective of this pilot trial was to compare the runnability and the printability of the inventive coating composition comprising the treated calcined clay and the preferred coating formulation to an ink jet coating formulation (unknown) comprising silica pigments of the prior art. The base stocks were supplied by Otis Specialty, Inc., and the operating parameters of the roll gate coater for each paper machine line were set up as close together as possible. The speed of each coater was 800 feet per minute. The target coat weights were 2, 3, 5, and 8 pounds per 3300 $ft^2$ or about 3.0, 4.5, 7.5, and 12 $g/m^2$ per side of base stock.

The coating properties, the coated sheet properties, and the printing properties for the silica pigment of the prior art and for the treated calcined clay pigment of the invention are given in Table IV. As stated herein above the coating formulation and the kinds of chemicals for the inventive clay pigment were essentially the same as that in 3) First Coating Pilot Trial described hereinabove.

TABLE IV

| Coating Properties: | Prior Art | Invention |
|---|---|---|
| % Coating Solids | 32 | 34 |
| OBA Added | 3% | 0 |
| Brookfield Viscosity | | |
| Spindle # | 5 | 5 |
| @10 rpm | 3560 cps | 8400 cps |
| @20 rpm | 2440 cps | 5400 cps |
| @50 rpm | 1560 cps | 2800 cps |
| @100 rpm | 1180 cps | 1740 cps |
| Hercules Viscosity | | |
| @4400 rpm (kilodyne-cm) | 5200 | 3000 |
| Bob | E | E |
| Spring (kilodyne-cm) | 400 | 400 |
| pH | 9.0 | 7.9 |
| Temp. | 23.5° C. | 24° C. |
| Coated Sheet Properties | | |
| Coat Weight (gsm) | 5.3 | 5.41 |
| Brightness (ISO) | 94.96 | 90.16 |
| Fluorescence Component (%) | 6.23 | 0.16 |
| Hunter | | |
| L | 95.01 | 95.21 |
| a | 0.69 | −1.0 |
| b | −3.79 | 0.70 |
| Printing Properties | | |
| Ink Density | | |
| Cyan | 1.48 | 1.48 |
| Magenta | 1.48 | 1.47 |
| Yellow | 1.10 | 1.09 |
| Black | 1.27 | 1.43 |
| Print Mottle | | |
| Primary Colors (CMY*) | No | No |
| Sec. Colors (RGB**) | No | No |
| Black | No | No |
| Wicking | Minimum | Minimum |
| Bleeding | Minimum | Minimum |
| Water Fastness Resistance | Yes | Yes |

*"CMY" Means Cyan, Magenta and Yellow.
*"RGB" Means Red, Green and Blue.

The pilot trial provided excellent information particularly with regard to the runnability of the coatings on a gate roll coater. When its coating speed was at 800 feet per minute, the base stock with the inventive coating performed much better than that with the silica coating of the prior art. The base stock with the silica coating of the prior art tended to form large sized splitting patterns on the applicator, resulting in a rejectable rough sheet surface. It also showed significant coating misting problems during the trial, and dusting on the coated sheets was visible. Conversely, the paper with the inventive coating composition did not experience these problems. The coating was very stable on the coater's applicator, and it was easy to produce a wider range of coat weights such as 6 lbs. to about 11 lbs. per 3300 $ft^2$ (9–16.5 $g/m^2$) per side. The coated sheet with the inventive composition visually appeared to be much smoother than that of the prior art.

The base stock with the inventive coating showed a lower brightness value than that of the prior art. It is hypothesized that this is due to the fact that no optical brightening agents were added to the coating composition in this trial. The printing performance of these two coating colors was very similar, except for the black ink density where the black ink density for the paper with the inventive coating was higher at 1.43 compared to 1.27 for that of the prior art. This fact can be considered to be an important pigment feature where print contrast is important.

Competitive Product vs. Invention

A further test was performed on an ink jet paper with a silica coating commercially available from Degussa, Inc. under the tradename FK 310, and on an ink jet paper prepared with the inventive coating. Their physical properties are shown in Table V.

TABLE V

| Physical Properties | Invention | Prior Art |
|---|---|---|
| Brightness (ISO) | 89.9 | 98.02 |
| Hunter Color | | |
| L | 96.74 | 98.72 |
| a | −0.33 | 0.32 |
| b | 3.23 | −0.06 |
| Residue + 100 (%) | 0.0002 | 0.0024 |
| Residue + 200 (%) | 0.0006 | 0.0008 |
| Residue + 325 (%) | 0.0071 | 0.0020 |
| Einlihner Abrasion (mg) @ 100,000 revolutions | 12.4 | 5.6 |
| pH | 4.0 | 3.6 |
| Particle Size Distribution In Equivalent Spherical Diameter (E.S.D.) (Weight %) | | |
| <10 microns | 100 | 100 |
| <5 microns | 97.2 | 89.3 |
| <2 microns | 90.4 | 43.9 |
| <1 micron | 79.0 | 25.3 |
| <0.5 microns | 28.9 | 20.0 |
| <0.25 microns | 1.6 | 20.9 |
| Brookfield Viscosity cps @ 20 rpm, #2 | 380 | 2000+ |
| Solids % Slurry | 31.0 | 32.1 |

TABLE V-continued

| Physical Properties | Invention | Prior Art |
|---|---|---|
| Hercules Viscosity | | |
| Bob | A | A |
| Dynes at | 18.0 | 18.0 |
| rpm | 2285 | 400 |

The important point of the results shown above is that the invention has better Brookfield and Hercules high sheer viscosities compared to the prior art. The prior art composition tended not to circulate properly in the coater, and tended to form split patterns and coating misting on the waters. From the above, it can be seen that the inventive coating composition provides a high performance, ink jet coating pigment for making a matte finish coated ink jet paper. The product specifications for this coating composition of the invention appears in Table VI below:

TABLE VI

| Specification For Ink Jet Coating Pigment Of The Invention | |
|---|---|
| Brightness Range: | 88–92 ISO |
| Particle Size Distribution (E.S.D. in weight %) | |
| <10 microns | 100 |
| <5 microns | 96–98 |
| <2 microns | 88–92 |
| <1 micron | 78–82 |
| <0.5 microns | 28–32 |
| <0.25 microns | <2 |
| % Slurry Solid | 30–32 |
| Brookfield Viscosity | 400–800 @ 20 rpm, 32% solid |
| Hercules Viscosity | 18 dynes at 900–1200 rpm, A Bob |
| pH | 3.6–5.0 |
| Abrasion | Max. 10 mg @ 100,000 revolutions |
| Residue | Max. 0.25% |

Two Recent Lab Studies

Recently, the inventors performed two lab studies to understand the influence of the type of pigment and latex binder with respect to coating on a paper and the printing properties of the coating.

First Recent Lab Study

In the first recent lab study, six different pigments were used while the coating formulation was kept constant for these six different pigments. The data is shown in Table VII.

TABLE VII

| | Inventive Pigment | KCS ® | Astraglaze ® | Albacar | Bentonite-H | Carbilux ® |
|---|---|---|---|---|---|---|
| Coating Properties | | | | | | |
| % Solid | 35 | 34.6 | 34.7 | 34.8 | 32.3 | 38.7 |
| Precipitate | No | Yes | Yes | No | Yes | No |
| Dispersion | Good | Poor | Poor | Good | Poor | Poor |
| pH | 6.8 | 7.1 | 6.8 | 7.5 | 7.5 | 7.3 |
| Brookfield Viscosity | | | | | | |
| Spindle # | 6 | 5 | 5 | 5 | 5 | 5 |
| @ 10 | 14,300 | 8,720 | 7,840 | 8,360 | 4,080 | 12,400 |
| @ 20 | 8,600 | 5,300 | 5,500 | 4,920 | 2,680 | 7,500 |
| @ 50 | 4,080 | 2,520 | 2,840 | 2,580 | 1,610 | 4,000 |

TABLE VII-continued

| | Inventive Pigment | KCS ® | Astraglaze ® | Albacar | Bentonite-H | Carbilux ® |
|---|---|---|---|---|---|---|
| @ 100 | 2,050 | 1,580 | 1,780 | 1,580 | 1,180 | 2,720 |
| Hercules | | | | | | |
| @ 4400 (kilodyne-cm) | 3,400 | 2,200 | 2,500 | 2,650 | 3,000 | 3,600 |
| Bob | E | E | E | E | E | E |
| Printing Properties | | | | | | |
| Color Density | | | | | | |
| Cyan | 1.51 | 1.23 | 1.25 | 1.39 | 1.25 | 1.38 |
| Magenta | 1.54 | 1.29 | 1.32 | 1.50 | 1.33 | 1.38 |
| Yellow | 1.13 | 1.08 | 1.07 | 1.17 | 1.11 | 1.11 |
| Black | 1.61 | 1.65 | 1.66 | 1.58 | 1.65 | 1.59 |
| Ink Drying Rate | | | | | | |
| Pri Colors (C, M, Y) | Fast | Fast | Fast | Fast | Fest | Fast |
| Sec. (R, G, B) | Fast | Slow | Slow | Fast | Fast | Slow |
| Black | Fair | Slow | Slow | Fair | Slow | Slow |
| Water Fastness Resist. | Good | Good | Good | Good | Good | Fair |
| Print Mottte | No | Yes | Yes | Yes | Yes | Yes |
| Wicking | Min. | Min. | Min. | Min. | Some | Min. |
| Bleeding | Min. | Some | Min. | Min. | Some | Min. |
| Coating Formulation: | | | | | | |
| Pigment 30 g | | | | | | |
| Water 70 g | | | | | | |
| PVOH (30%) 20 cc (binder) (Airvol ® 103) | | | | | | |
| Latex CP 654NA (50%) 30 cc (binder) | | | | | | |
| HTI5800 m 30 cc (cross-linking agent) | | | | | | |

KCS® and Astraglaze® are hydrous kaolin clays, the trademarks of which are owned by ECC International Inc., the assignee of the present invention. Albacar is a precipitated calcium carbonate, a tradename of the Pfizer Corporation. Bentonite-H is a hydrous kaolin clay supplied by Allied Colloids. Carbilux® is a ground calcium carbonate, the tradename of which is owned by the assignee of the present invention.

From the data, it is to be noted that the dispersion of the inventive pigment (calcined kaolin clay treated with cationic polymer) was "good" compared to most of the other pigments. It is to be particularly noted that the color densities for the inventive pigment improved over that of the prior art pigments, and that there was no print mottle, and a minimum amount of wicking and bleeding with the inventive pigment.

Second Recent Lab Study

The second recent study involved both the inventive pigment and the chemicals of the preferred coating formulation of the invention where the cationic polymer (Hydraid 2060) was held constant while the dosages for the polyvinyl alcohol and latex varied. The data is shown in Table VIII. From the table, it can be seen that No. 6 gives the optimum color density results at 1.47, 1.39, 1.03, and 1.47 for 14 parts Hydraid 2060, 20 parts polyvinyl alcohol, and 20 parts latex.

TABLE VIII

| Sample ID | Ctrl. | 1 | 2 | 3 | 4 | 5 | 6 | 7 | 8 |
|---|---|---|---|---|---|---|---|---|---|
| HD (Hydraid 2060) | 14 | 14 | 14 | 14 | 14 | 14 | 14 | 14 | 14 |
| Airvol ® PVOH (30%) | 20 | 25 | 30 | 20 | 20 | 20 | 20 | 25 | 25 |
| Latex CP 654NA (Latex) | 0 | 0 | 0 | 5 | 10 | 15 | 20 | 5 | 10 |
| Printing Properties | | | | | | | | | |
| Color Density | | | | | | | | | |
| Cyan | 1.38 | 1.40 | 1.41 | 1.42 | 1.45 | 1.45 | 1.47 | 1.43 | 1.46 |
| Magenta | 1.16 | 1.21 | 1.24 | 1.20 | 1.29 | 1.34 | 1.39 | 1.21 | 1.35 |
| Yellow | 0.82 | 0.85 | 0.88 | 0.85 | 0.93 | 0.96 | 1.03 | 0.86 | 0.95 |
| Black | 1.40 | 1.46 | 1.46 | 1.48 | 1.46 | 1.48 | 1.47 | 1.39 | 1.46 |
| Ink Drying Rate | | | | | | | | | |
| Pri. Colors (C, M, Y) | Fast | Fast | Fast | Fast | Fast | Fast | Fast | Fast | Fast |
| Sec. Colors (R, G, B) | Fast | Fast | Fast | Fast | Fast | Fast | Fast | Fast | Fast |
| Black | Fair | Fair | Fair | Fair | Fair | Fair | Fair | Fair | Fair |
| Water Fast. Resist. | Good | Good | Good | Good | Good | Good | Good | Good | Good |
| Print Mottle | No | No | No | No | No | No | No | No | No |
| Wicking | Min. | Min. | Min. | Min. | Min. | Min. | Min. | Min. | Min. |
| Bleeding | Min. | Min. | Min. | Min. | Min. | Min. | Min. | Min. | Min. |
| Rev. Test | Good | Good | Good | Good | Good | Gaod | Good | Good | Good |

The results of Table VIII may be indicative of the fact that the cationic polymer, the polyvinyl alcohol binder, and the latex binder may all contribute to improve the color density for the inventive pigment. These results may substantiate the fact that the cationic polymer acts as a dispersant according to the teachings of the invention, and that it provides good water fastness at the pigmentpolymer ratio of about 4 to 1.

While the present invention has been particularly set forth in terms of specific embodiments thereof, it will be understood in view of the instant disclosure that numerous variations upon the invention are now enabled to those skilled in the art, which variations yet reside within the scope of the present invention. Accordingly, the invention is to be broadly construed and limited only by the scope and spirit of the claims now appended hereto.

What is claimed is:

1. A coating composition for use in a coating formulation applied to a substrate to produce a coated surface for a matte grade coated ink jet paper which receives an anionic dye or ink in an ink jet printing process, said coating composition consisting essentially of:

(a) an aqueous slurry containing about 30 to about 70 weight % solids, based on the weight of said aqueous slurry, of a calcined kaolin clay; and (b) an effective amount of a cationic polymer or cationic polymer admixture which reacts with said calcined kaolin clay to chemically treat said calcined kaolin clay to produce a net positive charge on said calcined kaolin clay, said calcined kaolin clay being a porous engineered clay and having a narrow particle size distribution such that about 90 weight % of the particles are less than 2 microns E.S.D., about 80 weight % of the particles have an E.S.D. less than 1 micron, and about 30 weight % of the particles have an E.S.D. less than 0.5 microns.

2. A coating formulation applied to a substrate to produce a coated surface for a matte grade coated ink jet paper which receives an anionic dye or ink in an ink jet printing process, said coating formulation comprising a coating composition and said coating composition consisting essentially of:

(a) an aqueous slurry containing about 30 to about 70 weight % solids, based on the weight of said aqueous slurry, of a calcined kaolin clay; and (b) an effective amount of a cationic polymer or cationic polymer admixture which reacts with said calcined kaolin clay to chemically treat said calcined kaolin clay to produce a net positive charge on said calcined kaolin clay, said calcined kaolin clay being a porous engineered clay and having a narrow particle size distribution such that about 90 weight % of the particles are less than 2 microns E.S.D., about 80 weight % of the particles have an E.S.D. less than 1 micron, and about 30 weight % of the particles have an E.S.D. less than 0.5 microns, said calcined kaolin clay causing said anionic ink or dye to react with said calcined kaolin clay in said ink jet printing process to affix said anionic ink or dye to said coated surface of said matte grade coated ink jet paper, and whereby said anionic ink or dye is capable of penetrating into said calcined clay for complete drying thereof on said coated surface of said matte grade coated paper.

3. A coating formulation of claim 2 wherein said effective amount of said cationic polymer or cationic polymer admixture in said coating composition is about 5 to about 50 parts per 100 parts of said calcined clay on a weight percent basis.

4. A coating formulation of claim 2 wherein said cationic polymer in said coating composition has a molecular weight of about 1000 to about 5 million daltons.

5. A coating formulation of claim 2 wherein said calcined clay comprises porous aggregates where the mean internal pore size of the aggregates is about 0.80 microns in diameter and has a total pore volume of about 0.60 $cm^3/g$ to about 2.00 $cm^3/g$.

6. The coating composition of claim 1 wherein said effective amount of said cationic polymer or cationic polymer admixture is about 5 to about 50 parts per 100 parts of said calcined kaolin clay on a eight percent basis.

7. The coating composition of claim 1 wherein said cationic polymer has a molecular weight of about 1000 to about 5 million daltons.

8. The coating composition of claim 1 wherein said cationic polymer is selected from the group consisting of polyamines, polydialkybdiallylammonium halides, and copolymers prepared using a dialkyldiallylammonium halide.

9. The coating composition of claim 1 wherein said calcined clay in aggregate form has a mean internal pore size of about 0.80 microns in diameter.

10. The coating composition of claim 1 wherein said calcined kaolin clay has a total pore volume of about 0.60 $cm^3/g$ to about 2.00 $cm^3g$.

11. A coating formulation of claim 2, wherein said coating formulation further comprises:

about 20 to about 30 parts by weight, on a weight percent basis per 100 parts by weight said calcined kaolin clay, of a polyvinyl alcohol binder;

about 30 to about 50 parts by weight, on a weight percent basis per 100 parts by weight said calcined kaolin clay, of a latex binder; and about 0 to about 5.0 parts by weight, on a weight percent basis, per 100 parts by weight calcined kaolin clay, of a cross-linking agent, and wherein the ratio of said calcined kaolin clay to said polyvinyl alcohol binder to said latex binder on a dry weight basis ranges from about 1.0:0.15:0.05 to about 1:1:1.6.

12. A method of preparing a coating composition for use in a coating formulation for coating a substrate to produce a matte grade coated ink jet paper which receives an anionic dye or ink in an ink jet printing process, the steps consisting essentially of: a) preparing a calcined kaolin clay aqueous slurry containing about 30 to about 70 weight % solids, based on the total weight of said aqueous slurry; and b) adding an effective amount of at least one cationic polymer to said aqueous slurry to chemically treat said calcined clay to produce a net positive charge on said clay, which clay reacts with said anionic dye or ink on said ink jet paper, and c) using said coating composition of steps (a) and (b) in said coating formulation, to coat said substrate, said calcined kaolin clay being a porous engineered calcined kaolin clay and having a narrow particle size distribution such that about 90 weight % of the particles are less than 2 microns E.S.D., about 80 weight % of the particles have an E.S.D. less than 1 micron, and about 30 weight % of the particles have an E.S.D. less than 0.5 microns.

13. The method of claim 12, for said coating formulation:

adding about 20 to about 30 parts by weight, on a weight percent basis, per 100 parts by weight of said calcined kaolin clay, of a polyvinyl alcohol binder; about 30 to about 50 parts by weight, on a weight percent basis, per 100 parts by weight of said calcined kaolin clay, of a latex binder, and about 0 to about 5.0 parts by weight, on a weight percent basis, per 100 parts by weight of said calcined kaolin clay, of a cross-linking agent; and wherein the ratio of clay to polyvinyl alcohol binder to latex binder on a dry weight basis ranges from about 1.0:0.15:0.05 to about 1.0:1.0:1.6.

14. A method of claim 12 wherein said calcined clay comprises porous aggregates where the mean internal pore size of the aggregates is about 0.80 microns in diameter and has a total pore volume of about 0.60 $cm^3/g$ to about 2.00 $cm^3/g$.

15. A method of claim 12 wherein said effective amount of said cationic polymer or cationic polymer admixture in said coating composition is about 5 to about 50 parts per 100 parts of said calcined clay on a weight percent basis.

* * * * *